United States Patent

Noguchi

[11] 4,127,785
[45] Nov. 28, 1978

[54] MINIATURE MOTOR

[75] Inventor: Ichiro Noguchi, Tokyo, Japan

[73] Assignee: Gakken Co., Ltd., Ohta, Japan

[21] Appl. No.: 737,554

[22] Filed: Nov. 1, 1976

[30] Foreign Application Priority Data

| May 25, 1976 | [JP] | Japan | 51-66651[U] |
| Jun. 7, 1976 | [JP] | Japan | 51-73357[U] |
| Jun. 21, 1976 | [JP] | Japan | 51-81378[U] |
| Aug. 4, 1976 | [JP] | Japan | 51-104190[U] |

[51] Int. Cl.² .................................... H02K 5/00
[52] U.S. Cl. ........................... 310/89; 310/40 MM;
310/42; 310/1; 35/13; 220/4 C; 220/324
[58] Field of Search ................. 310/40 MM, 89, 242,
310/91, 247, 71, 237, 42, 1; 35/13, 51; 46/234,
248; 220/4 C, 324

[56] References Cited

U.S. PATENT DOCUMENTS

| 2,269,035 | 1/1942 | Neal | 35/13 |
| 2,818,518 | 12/1957 | Phaneuf | 310/237 |
| 2,842,692 | 7/1958 | Johnson | 310/42 |
| 3,313,968 | 4/1967 | Kaiser | 310/89 |
| 3,391,291 | 7/1968 | Benson | 310/89 |
| 3,445,692 | 5/1969 | Kato | 310/42 |
| 3,445,693 | 5/1969 | Crawshaw | 310/42 |
| 3,760,209 | 9/1973 | Hult | 310/91 |

FOREIGN PATENT DOCUMENTS

| 1,463,862 | 8/1964 | Fed. Rep. of Germany | 310/89 |
| 1,289,907 | 2/1969 | Fed. Rep. of Germany | 310/40 MM |
| 621,309 | 4/1949 | United Kingdom | 310/1 |

Primary Examiner—R. Skudy
Attorney, Agent, or Firm—Irving M. Weiner

EXEMPLARY CLAIM

An educational electric motor adapted to be easily assembled and disassembled, comprising a three-part case formed from a central magnetic body connected at each end with transparent front and rear covers. Tape or clamping members are used to connect together the three-part case. An assembled rotor may be easily fitted within the motor case to rotate therein. A current feeding member is removably secured to at least one of the covers. The motor may be readily assembled by children and the transparent components permit the underlying principles of electricity and operation to be readily grasped and learned.

10 Claims, 7 Drawing Figures

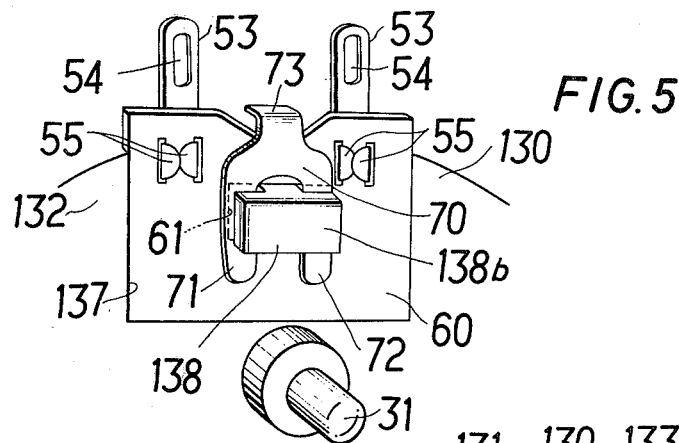
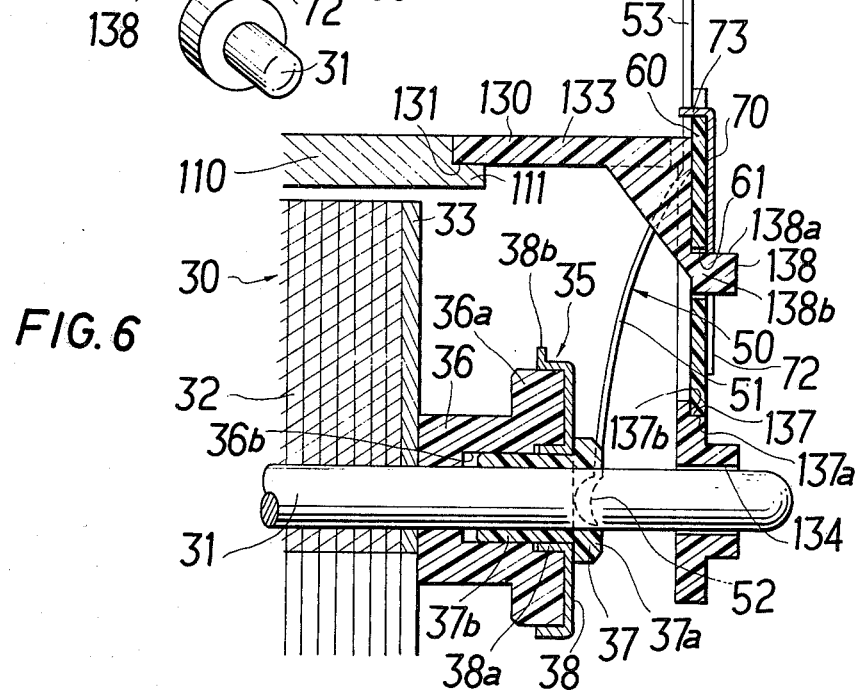
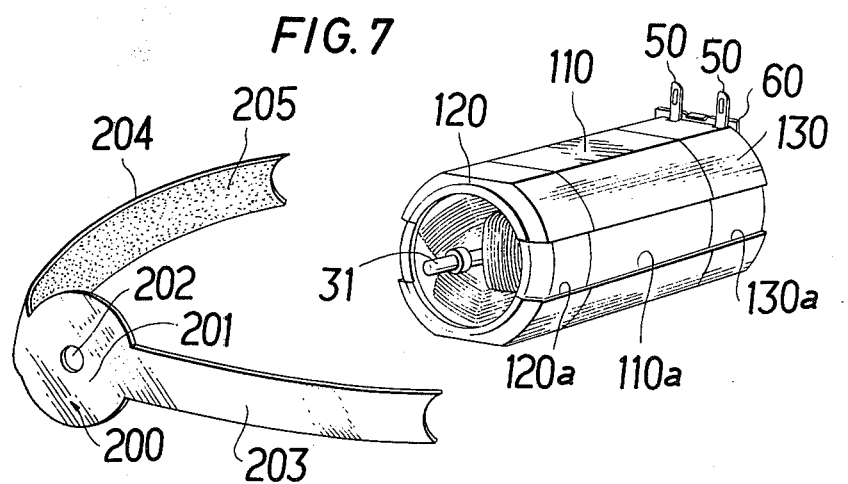

MINIATURE MOTOR

The present invention relates generally to a novel electric motor. In particular, the invention relates to a miniature motor which is simple to disassemble and assemble, can be assembled in a simple operation by school children and other children, which has its underlying electric principles taught and popularized through assembly, and which has a performance sufficient as a power source for toys and models.

BACKGROUND OF THE INVENTION

Some miniature motors for models to be assembled by school children and others are already known. Such conventional motor provides component parts, such as a shaft, iron cores, coils, commutator, brush forming parts, magnet and case, school children and others may assemble a motor by reference to instructions.

Such a conventional motor to be assembled is very useful for school children and others to learn electricity and the structure of the motor, but is considerably difficult to assemble. Particularly, the operation of winding the coils on the iron cores is difficult, and the number of winds of the coils influences the performance of the motor. Therefore, if the winding of the coils is not proper, the operation of the motor will be poor or fail. Also, the operation of fitting the commutator and brushes is difficult. Therefore it is difficult for school children and others to perfectly assemble and complete the motor to be assembled. Therefore, even though the structure and principle of the motor can be learned, the completed motor cannot immediately be used as a power source for toys and models for teaching materials.

Further, almost all conventional miniature motors to be used for toys and models are sold as perfectly assembled completed products so that school children and other children may buy these completed products and incorporate them in toys and models to be completed. Such motors are not suited to have their electricity principles and structure understood and learned.

Therefore, it is desirable to divide a motor into a plurality of assembled parts to be provided so that children and school children may simply assemble them. However, the degree of the semi-completion is so difficult that, if the assembly is too simple, it will not be suited to have the structure understood and learned, and, if it is too difficult, the foregoing problems will occur.

Further, if the structure is complicated, then to simplify the assembly by school children and other children, the motor will be affected by the cost and will not be able to be easily used for a teaching tool.

The present invention effectively solves the foregoing problems.

SUMMARY OF THE INVENTION

The present invention provides an electric motor including a front cover having a first shaft inserting hole therein, and a rear cover having a second shaft inserting hole therein. A magnetic body is disposed between the front and rear covers. A rotor is provided with a shaft, and such shaft is inserted through the first and second shaft inserting holes. The motor also includes first means for integrally connecting together the magnetic body and front and rear covers to form the entire outer case of the motor. The rotor also includes a commutator, an iron core, and coils provided on the shaft. At least a portion of the rotor is rotatably disposed in the magnetic body. At least one current feeding member is removably secured to at least one of the covers.

An object of the present invention is to provide a miniature motor which can positively be assembled or disassembled in a simple operation and is adapted for teaching material for school children and other children so that they may learn about electricity and obtain knowledge of the structure of the motor.

Another object of the present invention is to provide a miniature motor which is assembled to provide a source of learning, and yet develops a function sufficient to be practically used as a power source for toys and models.

A further object of the present invention is to provide a miniature motor which can be simply assembled or disassembled by school children and others, and yet is so made as to be able to have the principle, structure and operation of the motor well understood and learned.

A still further object of the present invention is to provide a miniature motor which is not greatly altered while attaining the above objects, is simple in structure, can be provided cheaply, can be easily bought for a teaching material or a toy for school children and other children, and can easily have the motor and its underlying electric principles learned while being assembled.

Specifically, the present invention provides a miniature motor wherein the motor case is divided into three parts of front and rear covers and a magnet which is also a case in the middle part, and a rotor having iron cores, coils and commutators fitted to a shaft are formed as a unit. Metal fixtures, each of which is a combined brush and outisde connecting terminal, can be set on one cover by a simple manual step. They are combined and the case and front and rear covers are integrally assembled with a fitting.

Therefore, in the present invention, the rotor unit, which is conventionally difficult to assemble, can be assembled by being merely set, and the assembly of the devices for feeding currents from the current source, such as the brushes and connecting terminals, is simplified so that even school children and other children may simply and interestingly assemble the motor. Further, the case and front and rear covers are provided disassembled so that a miniature motor, which includes the above-mentioned current feeding devices, can be assembled and used as a power source for toys and models simply, positively and practically even by school children and other children.

Further, in the present invention, both or either of the front and rear covers is formed of a transparent material so that the internal structure of the motor may be seen in operation. Also, there is provided a miniature motor wherein the relation between the brush and commutator and the operating principles can be concretely learned visually because of such transparent components.

BRIEF DESCRIPTION OF THE DRAWINGS

FIG. 5 is a perspective view of the cover as fitted with the brushes.

FIG. 6 is a vertically sectioned side view of an essential part as fitted with said cover.

FIG. 7 is a perspective view showing a modified embodiment of means for connecting together the covers and case.

DETAILED DESCRIPTION

Figure 2:
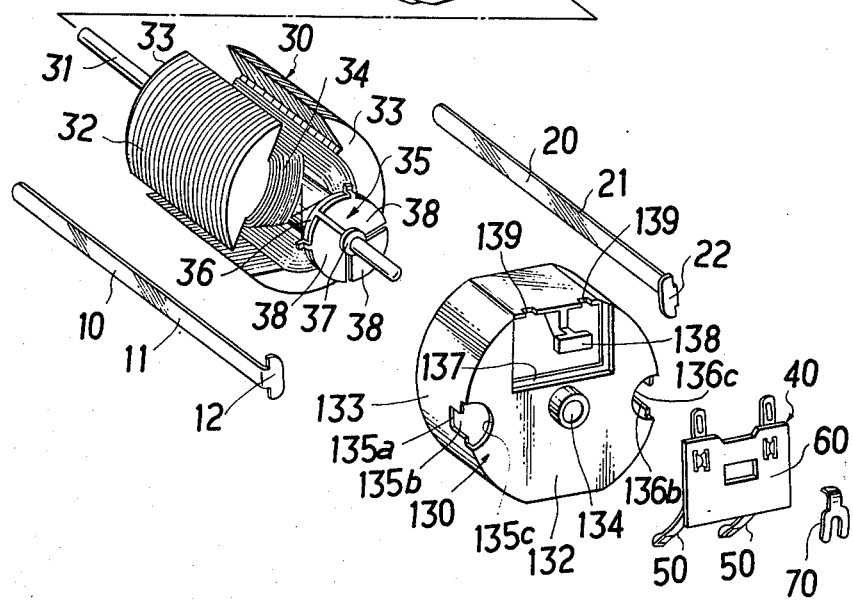
FIG. 2 is a perspective view of the miniature motor disassembled.

The basic formation of a miniature motor to be assembled according to a first embodiment of the present invention is illustrated in FIG. 2.

A motor case 100 consists of a magnetic body 110 in the middle part, and front and rear covers 120 and 130 in the front and rear. The body 110 may be formed to be cylindrical and of a proper length. Body 110 may be formed of a magnet which is flat above and below on its outer periphery in this particular design, and may be magnetized to be N and S poles on the left and right walls as viewed in FIGS. 1 and 2. Locking projecting edges 111 are formed to project respectively on the front and rear open end surfaces in the lengthwise direction of the body 110 so as to surround or enclose such open end surfaces, and are provided a little inside of the outer periphery.

The front cover 120 consists of a front plate 122 closing the front surface and a cylindrical part 123 opened on its rear surface opposite to body 110, and may be integrally fabricated from plastic. An inner peripheral part 121 of the open end edge of the cylindrical part 123 of the cover 120 is of an inside diameter closely engaging the outer periphery of the locking projecting edge 111 of body 110. A shaft inserting hole 124 is formed at the center of the front plate 122. Locking holes 125 and 126 are formed to be of the same width on the left and right of the front plate 122, and are provided as extended by proper lengths respectively from the left and right end parts of the front plate 122 to both side parts of the cylindrical part 123. Inner end edges 125a and 126a on the cylindrical part 123 side in the lengthwise direction of the locking holes 125 and 126 are formed to be concave, arcuate or notched in the form of a V, in the axial direction for accommodating first means, such as clamping members, described below. The cover 120 may be made transparent and of electrically insulating plastic material, such as a polycarbonate resin, acryl resin, or polystyrol resin.

Rear cover 130 may be made of the same material as of the front cover 120, and consists of a flat rear plate 132 having a shaft inserting hole 134 formed in the center part and a cylindrical part 133 continued with it, the inside diameter closely fitting the outer periphery of the projecting edge 111 of body 110 as shown in FIG. 6. Locking holes 135 and 136, corresponding respectively to the locking holes 125 and 126 of front cover 120 are formed respectively on the left and right of the rear cover 130. These locking holes 135 and 136 include, respectively, semicircular inserting hole parts 135c and 136c opened outwardly on the left and right of the end surface of the rear cover 130, and slot parts 135b and 136b formed to be the same width as the locking holes in front cover 120 and extending from the parts near the outer periphery of the inserting hole parts 135c and 136c and provided as extended on both sides of the cylindrical part 133. The inner end 135a of the slot part 135b is formed to be linear.

First means, such as clamping members 10 and 20, to integrally connect the case-forming members 110, 120 and 130, may be formed of narrow long metal plate materials in a set of two. The band-shaped clamping members 10 and 20 are formed in the shapes of bands of soft metal, such as aluminum. The widths of the band-shaped bodies 11 and 21 are set to be of widths which can closely fit the narrow parts of locking holes 125, 126 and 135, 136. Wider locking parts 12 and 22 engaging respectively with the inserting hole parts 135c and 136c of the locking holes in rear cover 130 are formed at the rear ends of the bodies 11 and 21, and may be bent in the form of an L by 90° toward the cover.

A rotor 30 consists of a shaft 31, Y-shaped iron cores 32 fitted on the periphery of shaft 31 and laminated in the axial direction, insulating plates 33 provided in front and rear of the laminated iron cores, coils 34 wound on the iron cores including the insulating plates, and a commutator 35 provided on the shaft 31 to the rear of the iron cores 32. As shown in FIG. 6, the commutator 35 consists of a first supporting member 36 of a large diameter made of an insulating material and pressed on the shaft 31, a second supporting member 37 for providing a cylindrical part 37b of fitting member 36, and three commutator pieces 38. The first supporting member 36 is provided with a cavity 36b having two large and small inside diameters and opening rearwardly in the axial direction, and a flange part 36a on its end surface. The second member 37 is provided with a flange part 37a on the end surface together with cylindrical part 37b. Fan-shaped commutator pieces 38 are bent to be L-shaped on their inner peripheral sides. These L-shaped bent parts 38a are inserted into the cavity 36b in first supporting member 36 so that the back surfaces of the commutator pieces may be in contact with the end surface of the flange part 36a. The three commutator pieces 38 are thus radially arranged. The cylindrical part 37b of second supporting member 37 is pressed into the cavity 36b so that the base parts of the pieces 38 may be pressed and held between the flanges 36a and 37a. The commutator pieces 38 are provided respectively with locking parts 38b on their outer peripheral portions for connection with the coils. The thus formed rotor 30 is provided assembled.

Figure 3:
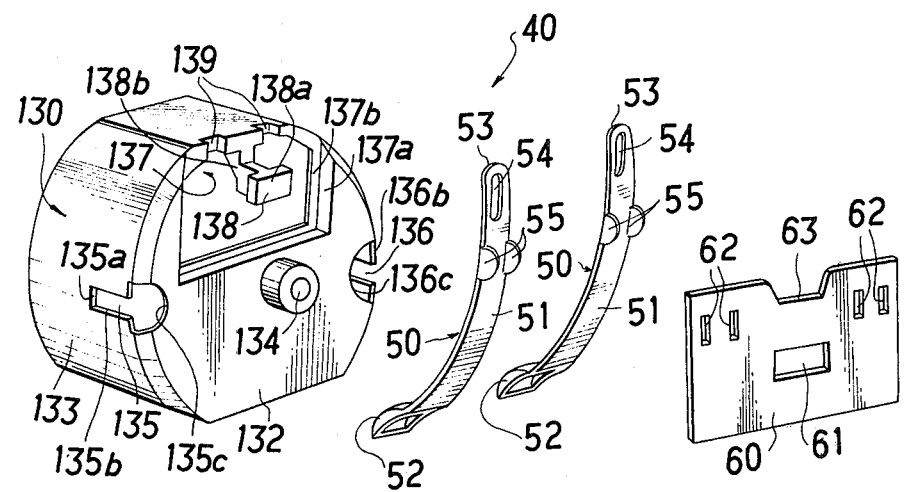
FIG. 3 is a perspective view of a rear cover and brush parts disassembled.

FIG. 2 shows a part 40 for feeding currents to the commutator shown as already partly assembled. The current feeding part 40 is shown in FIG. 3 disassembled. A window 137 is formed in the axial direction through the upper side part of the end surface of a rear plate 132 of the above mentioned rear cover 130. A bank part 137b projecting toward the inner periphery 137a is formed on the inner side of the window 137 and a step is provided between the inner periphery 137a and bank part 137b of the window 137. An engaging projection 138 projecting rearward is provided in the center of the upper side part of the inner periphery of the window 137, and consists of an engaging part 138a projecting rearward of the rear plate 132 and expanding to the right and left and a connecting part 138b for connecting the upper side end surface of the window 137. Engaging grooves 139, concaved forwardly in the axial direction, are made at equal spacings to the right and left of part 138b as a center on the upper side end surface of window 137 and to the right and left of the engaging projection 138.

Two current feeding members 50 are provided to correspond to both poles of the current source and are of exactly the same shape and structure. Each current feeding member 50 is a combined brush and terminal for external connection integrally formed in one member, is of a conductive metal material, and is preferably of material having a proper resiliency, such as brass or phosphor bronze.

A body 51 of the current feeding member 50 is formed of a plate-shaped material, and is arcuately curved on its side. Body 51 is also provided with a brush part 52 arcuate on the side to project at the lower end and has a terminal part 53 formed at the upper end, and a slot 54 made in the lengthwise direction in part 53 to be convenient to connect with a suitable current source cord (not shown). Locking projecting pieces 55 are integrally provided to project rearwardly on both right and left side edges a little below part 53. Two current feeding members 50 of the above mentioned structure are prepared as shown in FIG. 3.

FIG. 3 illustrates a holding plate 60 for the current feeding members 50. Holding plate 60 is formed of insulating material, such as a fibrous material. The contour of plate 60 is shaped to fit the inner periphery 137a of window 137 in rear cover 130. Plate 60, a hole 61, to fit part 138a of projection 138, formed in its center and has two sets each of two current feeding member fitting holes 62 arranged on the right and left of its upper side part. Further, the upper side part of plate 60 is notched at 63 to be concave.

Figure 4:
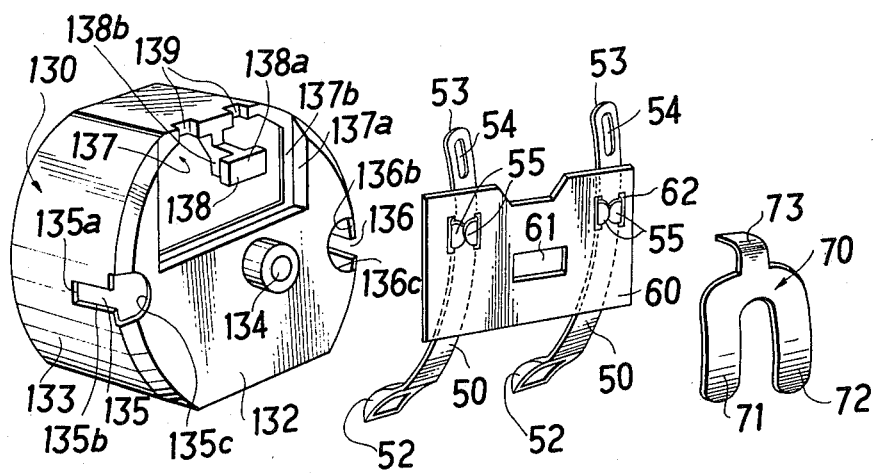
FIG. 4 is a perspective view of a fitting plate fitted to the brushes and a locking member for assembling and locking said fitting plate to the cover.

A locking piece or member 70 to lock the holding plate 60 with the current feeding members 50 to the rear cover is shown in FIG. 4. Member 70 may be formed of a plate spring material, may be provided with forked curved leg pieces 71 and 72 and a gripping piece 73 extended upwardly from the upper end of the middle part of leg pieces 71 and 72 and bent forwardly to be L-shaped at its upper end. Member 70 may be integrally shaped of one plate material. The clearance between leg pieces 71 and 72 is made to be somewhat larger than the width of the connecting part 138b of projection 138.

As mentioned above, the motor consists of the body 110 made of a magnet, front and rear covers 120 and 130, the already-assembled rotor 30, two band-shaped clamping members 10 and 20, two current feeding members 50, holding plate 60 and locking member 70. These parts are provided as contained in a proper case, such as, for example, a transparent case.

The assembly of the motor is further explained hereinbelow.

First, the current feeding part 40 is fitted to the rear cover 130. As shown in FIG. 3, the locking projecting pieces 55 of the current feeding members 50 are inserted into the fitting holes 62 in plate 60, and then the pieces 55 projected from the rear surface of plate 60 are bent toward each other to be overlapped so that the members 50 may be fitted and connected to one plate 60 (as shown in FIG. 4). Brush parts 52 and terminal parts 53 may project respectively below and above the rear surface of plate 60. The brush parts may resiliently project forwardly.

FIGS. 2 and 4 show this position. The current feeding members 50 may be provided connected with the holding plate 60 in advance. Plate 60 connected to members 50 is fitted into window 137 so that the brush parts 52 may be inserted into window 137 and projected inwardly from the back surface of plate 132. When fitting plate 60 into window 137, the hole 61 is fitted over the part 138a which will project rearwardly from the hole 61.

Then, both leg pieces 71 and 72 of locking member 70 are inserted into the clearance between the surface of plate 60 and the opposed surface of part 138a to straddle part 138b. Leg pieces 71 and 72, which are made of plate spring material and are curved as shown in FIG. 4, will then be deformed to be flat and will press plate 60 against bank part 137b on the inner periphery of window 137 so that plate 60 may be secured to the end surface of rear plate 132. Further, when fitting plate 60 into window 137, the terminal parts 53 will fit in grooves 139 on the upper side of the window, and will project from the rear cover. This assembly is shown in FIG. 5.

Then, rotor 30 is fitted into body 110. Cover 120 is placed so that its inner peripheral part 121 fits the front one of edges 111 of body 110, and the shaft 31 projects out of hole 124. When orienting rotor 30, the commutator 38 will be positioned rearwardly. Then cover 130 is placed so that its inner peripheral part 131 fits the rear edge 111. The rear end of shaft 31 will project out of hole 134, and in this manner the shaft 31 of the rotor is journaled in the holes 124, 134 formed in the covers, with the thus provided bearing surfaces being satisfactory, without the need for additional bearing means. Parts 12 and 22 are inserted into hole parts 135c and 136c. Members 10 and 20 are pulled forward so that the narrow parts of the bases of parts 12 and 22 fit in slot parts 135b and 136b, and the bent parts will stop in contact with inner ends 135a and 136a.

The other narrow end parts, that is the front end parts of the clamping members, are placed in holes 125 and 126, and are bent inwardly with a tool, such as a screw driver. Parts 12 and 22 are bent inwardly in the same manner. Thus, cover 120, body 110 and cover 130 will be integrally connected in the axial direction by clamping members 10 and 20. Covers 120 and 130 will be connected with body 110 as females with males, respectively, through the projecting edges and the inner peripheral parts. Because the inner ends 125a and 126a respectively of holes 125 and 126 are formed to be V-shaped, when the clamping members 10 and 20 are bent, they will bite in on the cavity sides in the axial direction to prevent loosening.

Figure 1:
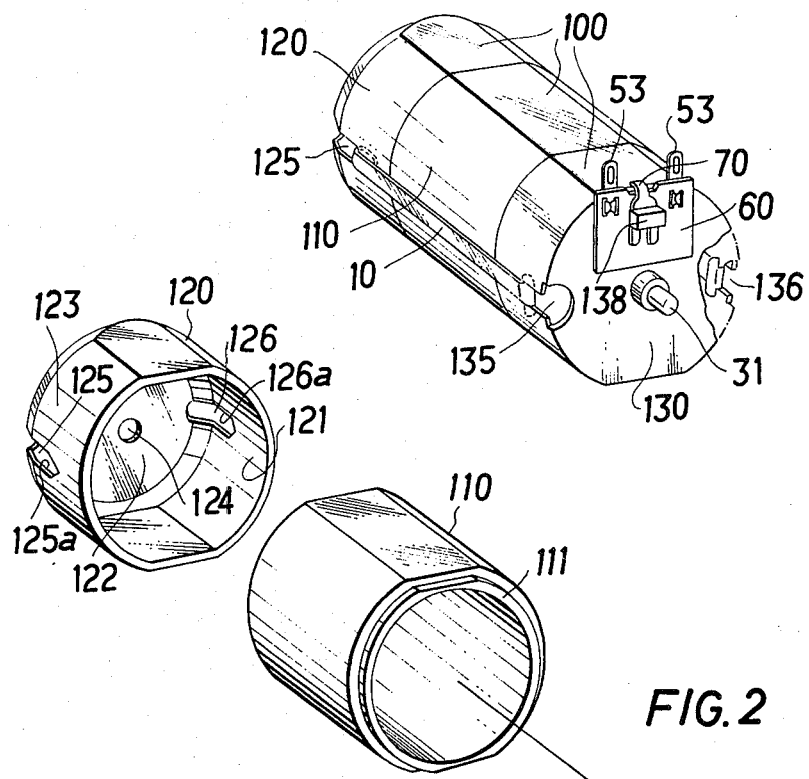
FIG. 1 is a perspective view of a miniature motor assembled.

In this connected state, the brush parts 52 will resiliently contact the end surfaces of the pieces 38 of commutator 35 as shown in FIG. 6. Wires from both poles of a current source, such as a battery, are wound respectively through slots 54 of parts 53 to feed a current to brush parts 52. The electric current is passed through coils 34 and through commutator 35 to excite iron cores 32 and rotate the rotor 30. The resulting rotation and torque can, for example, be utilized from the end of shaft 31 extending out of cover 120. The assembly is shown in FIG. 1.

Thus, the motor can be assembled by simply connecting the case divided into three parts including the body by the clamping members. The brushes and terminals, secured to the holding plate in advance, may be engaged with the rear cover. Alternatively, the current feeding member, made integral with the brush and terminal, can be secured to the holding plate by simple screwing and bending operations. Children can simply assemble the motor, can positively see and recognize the structures of the rotor and brushes, and can understand the structure of the motor through a simple assembling operation.

In the embodiment of the invention where the covers 120 and 130 are formed of transparent members, the rotation of the rotor, the contact of the brushes with the commutator, and the current feeding can be observed from outside. Therefore, the principle of driving the motor can be easily understood.

The motor is positively bound by members 10 and 20 as fastened and tensioned in the axial direction, and can be used as a power source for toys and models.

In disassembling, since members 10 and 20 are formed of soft metal, such as aluminum, when the bent parts are raised with the tip of a screw driver or the like to release the fastening, the clamping members will be removed from the locking holes 125, 126, 135 and 136 so that the covers may be separated from the body and the rotor 30 may be taken out. Then the gripping part 73 of locking member 70 is pulled to pull member 70 off of projection 138, and the holding plate 40 is removed so that the FIG. 2 condition is obtained again. Thus, the motor can be reversibly disassembled.

FIG. 7 shows a perspective view of another embodiment showing a connecting or first means in the form of a tape, instead of the band-shaped members 10 and 20. Fundamentally, it is of the same formation as mentioned above but covers 120 and 130 are connected with body 110 by a tape 200.

Tape 200 has a length equal to the sum of the axial lengths on the right and left sides of three connected members from cover 120. Tape 200 has a middle part 201 covering a part of cover 120. A shaft inserting hole 202 is made in the center of said middle part. Extended pieces 203 and 204 extend to the right and left of the middle part. Tape 200 is formed of a flexible tape of a synthetic resin and has an adhesive surface 205 painted with an adhesive formed on the back surface.

Grooves 120a, 130a and 110a having a width as large as, or somewhat larger than, the width of tape 200, are made on both outside surfaces of covers 120 and 130 and body 110. Middle part 201 is pasted to the end surface of cover 120, and the pieces 203 and 204 are pasted along grooves 120a, 130a and 110a so that the three parts may be integrally connected together by the tape. The covers and body of the motor may be integrally connected together through such tape.

We claim:

1. An educational electric motor comprising:
   a front cover having a first shaft inserting hole provided on the end surface of said cover;
   a rear cover having a second shaft inserting hole provided on the end surface of said cover;
   a magnetic body disposed between said front and rear covers;
   a rotor provided with a shaft, said shaft being supported in the front and rear through said first and second shaft inserting holes;
   said rotor also including a commutator, an iron core and coils provided on said shaft;
   at least a portion of said rotor being rotatably disposed in said magnetic body;
   a least one current feeding member removably secured to at least one of said covers;
   said end surfaces of said front and rear covers and the right and left side surfaces contiguous with said end surfaces having locking holes formed therein;
   a separate pair of right and left band-shaped clamping members inserted at both ends thereof into said locking holes and bent to integrally connect said front and rear covers and magnetic body together; and
   said clamping members being readily clamped and unclamped to connect and disconnect said front cover, said rear cover, and said magnetic body.

2. A motor according to claim 1, wherein:
   said magnetic body comprises a cylindrical body (110) formed of a magnetic material;
   said rotor includes a plurality of iron cores (32) laminated on said shaft (31);
   said commutator (35) being provided in the rear part in the axial direction on said shaft (31);
   said current feeding member (40) is removably fitted to one end surface of the rear cover (130);
   said rotor (30) is loosely fitted in said cylindrical magnetic body (110); and
   said front and rear covers (120, 130) are fitted respectively to the front and rear ends of said body (110).

3. A motor according to claim 2, wherein:
   said locking holes (125, 126, 135, 136) provided on the right and left of the front and rear covers (120, 130) are formed to be larger on the end surface side (132) of one cover (130) than in the other parts; and
   said band-shaped clamping members (10 or 20) are made of a soft metal, are bent at one end and provided with a tongue piece part (12 or 22) of a large width at said bent end inserted into each of said locking holes (135 or 136), and are at the other flat end thereof inserted into each of the locking holes (125, 126) of the other cover (120), and are bent at both ends to integrally connect the front and rear covers (120, 130) and magnetic body (110) together.

4. A motor according to claim 3, wherein:
   each said locking hole (125, 126) of the cover (120) in which said band-shaped clamping member (10, 20) is adapted to be inserted and bent at said flat end thereof to connect the cover (120) is formed to be concaved in the axial direction at the inner end.

5. A motor according to claim 2, wherein:
   at least one of said front and rear covers (120 or 130) is formed of a transparent material.

6. A motor according to claim 2, wherein:
   said front and rear cover (120, 130) are formed of a transparent material.

7. A motor according to claim 2, wherein:
   a through window (137) is formed in the upper side part of said end surface (132) of said rear cover (130); and
   an insulating holding plate (60) fitted with said current feeding member (40) is adapted to be locked to said through window (137).

8. A motor according to claim 7, wherein:
   said current feeding member (40) includes two similar elements (50), each one of said similar elements (50) being formed of a resilient conductive metal member (51) arcuate on the side, integrally provided with a brush part (52) at its lower end and with a terminal part (52) at its upper end, and integrally locked and connected with said insulating holding plate (60) through locking projecting pieces (55) provided in the middle part thereof.

9. A motor according to claim 8, wherein:
   a hole (61) is provided in the center of said insulating holding plate (60);
   a locking projection (138) projecting outwardly is provided in the upper side part of said window (137) in said rear cover (130);

said hole (61) in said holding plate (60) is fitted to said locking projection (138); and a locking piece (70) made of resilient material is adapted to be removably inserted between the tip of said locking projection (138) and said holding plate (60) to removably fit the holding plate including the current feeding elements (50) to said window (137) on said end surface (132) of said rear cover.

10. An eductational electric motor comprising:
a front cover having a first shaft inserting hole provided on the end surface of said cover;
a rear cover having a second shaft inserting hole provided on the end surface of said cover;
a magnetic body disposed between said front and rear covers;
a rotor provided with a shaft, said shaft being supported in the front and rear through said first and second shaft inserting holes;
first means for integrally connecting together said magnetic body and said front and rear covers;
said rotor also including a commutator, an iron core and coils provided on said shaft;
at least a portion of said rotor being rotatably disposed in said magnetic body;
at least one current feeding member removably secured to at least one of said covers;
said first means including an adhesive tape (200) pasted at least to the side surfaces of said magnetic body (110) and of said front and rear covers (120, 130) to integrally connect together said magnetic body and said front and rear covers; and
the jointed front and rear covers (120, 130) and magnetic body (110 being integrally adhesively connected together through said adhesive tape (200) which is integrally provided in its middle portion (201) thereof with a part fitting the end surface of said front cover (120) and on each side with a piece (203, 204) of a length corresponding to the length of said front and rear covers (120, 130) and magnetic body (110) as joined.

* * * * *